United States Patent
Rantala et al.

(10) Patent No.: US 11,032,471 B2
(45) Date of Patent: Jun. 8, 2021

(54) METHOD AND APPARATUS FOR PROVIDING A VISUAL INDICATION OF A POINT OF INTEREST OUTSIDE OF A USER'S VIEW

(71) Applicant: Nokia Technologies Oy, Espoo (FI)

(72) Inventors: Enrico Henrik Rantala, Berkeley, CA (US); Arto Juhani Lehtiniemi, Lempaala (FI); Durgaprasad Shamain, San Jose, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 945 days.

(21) Appl. No.: 15/198,629

(22) Filed: Jun. 30, 2016

(65) Prior Publication Data

US 2018/0007262 A1    Jan. 4, 2018

(51) Int. Cl.
*H04N 5/232* (2006.01)
*G06F 3/0484* (2013.01)
(Continued)

(52) U.S. Cl.
CPC ......... *H04N 5/23238* (2013.01); *G06F 3/011* (2013.01); *G06F 3/012* (2013.01);
(Continued)

(58) Field of Classification Search
CPC ..... A61B 17/32; A61B 17/155; A61B 17/157; A61B 17/1707; A61B 17/1764; A61B 2090/067; A61B 17/154; A61B 2562/0261; A61B 5/1071; A61B 5/6801; A61B 2034/2048; A61B 34/30; A61B 17/072; A61B 17/07207; A61B 17/068;
(Continued)

(56) References Cited

U.S. PATENT DOCUMENTS 5,499,136 A * 3/1996 Jones ................ G02B 27/2257
                                                  359/467
8,472,120 B2   6/2013 Border et al.
(Continued)

FOREIGN PATENT DOCUMENTS

EP          3037915 A1    6/2016
EP          3217267 A1    9/2017
WO     WO 2014/199155 A1  12/2014

OTHER PUBLICATIONS

International Search Report and Written Opinion for Application PCT/IB2017/053783 dated June 23, 2017 pp. 1-11.
(Continued)

*Primary Examiner* — Hung Q Dang
(74) *Attorney, Agent, or Firm* — Alston & Bird LLP

(57) ABSTRACT

A method, apparatus and computer program product are provided in order to generate a visual indication to a user of a point of interest outside of the user's view. In the context of a method, identifying a point of interest outside of a user's view is identified during display of an image in a first orientation. The method also includes causing at least a portion of the image to be repositioned, such as by being tilted, to provide a visual indication to the user of a point of interest outside of the user's view. After repositioning at least the portion of the image, the method further includes causing at least the portion of the image to return to the first orientation.

20 Claims, 7 Drawing Sheets

(51) Int. Cl.
*G06F 3/0485* (2013.01)
*G06F 3/01* (2006.01)

(52) U.S. Cl.
CPC ............ *G06F 3/013* (2013.01); *G06F 3/0485* (2013.01); *G06F 3/04845* (2013.01); *H04N 5/23296* (2013.01)

(58) Field of Classification Search
CPC .......... A61B 2017/00398; A61B 2017/00734; A61B 2017/07214; A61B 17/105; A61B 2017/00473; G06F 17/214; G06F 17/24; G06F 17/30011; G06F 3/00; G06F 3/01; G06F 3/0481; G06F 3/0484; G06F 1/16; G06F 3/0488; G06F 17/28; G06F 17/30; G06F 3/0485; G06F 3/14; G06F 19/00; G06F 3/0482; G06T 19/006; G06T 11/60; G06T 7/20; G06T 11/00; G06T 7/11; G06T 19/20; G06T 2200/24; G06T 2207/10016; G06T 2207/10028; G06T 15/08; G06T 2207/10004; G06Q 30/02; G06Q 30/0207; G06Q 30/0269; G06Q 30/0273; G06Q 30/0277; G06Q 20/383; G06Q 30/0623; G06Q 30/0255; G06Q 30/0257; H04N 21/222; H04N 21/23106; H04N 21/252; H04N 21/25891; H04N 21/262; H04N 21/26603; H04N 21/4332; H04N 21/44222
USPC .................................. 386/200–234, 239–248
See application file for complete search history.

(56) References Cited

U.S. PATENT DOCUMENTS

| | | | |
|---|---|---|---|
| 8,630,633 B1 | 1/2014 | Tedesco et al. | |
| 8,941,587 B2* | 1/2015 | Kim ...................... | G06F 1/1694 345/156 |
| 9,392,212 B1* | 7/2016 | Ross ...................... | G02B 27/017 |
| 9,495,783 B1* | 11/2016 | Samarasekera ...... | G06K 9/2054 |
| 9,661,293 B1* | 5/2017 | Ross ...................... | G02B 27/017 |
| 9,679,417 B1* | 6/2017 | Ross ...................... | G06F 3/012 |
| 9,986,219 B1* | 5/2018 | Ross ...................... | H05K 999/99 |
| 2004/0215523 A1 | 10/2004 | Wulff et al. | |
| 2005/0078851 A1* | 4/2005 | Jones ...................... | G06K 7/12 382/100 |
| 2005/0104897 A1 | 5/2005 | Walker et al. | |
| 2007/0282783 A1 | 12/2007 | Singh | |
| 2008/0110328 A1* | 5/2008 | Quinn ...................... | F41A 27/28 89/200 |
| 2010/0054595 A1* | 3/2010 | Demandolx ......... | G06K 9/3275 382/170 |
| 2010/0208975 A1 | 8/2010 | Jones et al. | |
| 2010/0259645 A1* | 10/2010 | Kaplan ................ | G11B 27/034 348/231.99 |
| 2010/0262911 A1* | 10/2010 | Kaplan ................ | G11B 27/034 715/719 |
| 2011/0141141 A1 | 6/2011 | Kankainen | |
| 2012/0133647 A1 | 5/2012 | Wu et al. | |
| 2012/0155778 A1 | 6/2012 | Buchmueller et al. | |
| 2012/0240077 A1* | 9/2012 | Vaittinen ............. | G06F 3/04815 715/781 |
| 2012/0262372 A1* | 10/2012 | Kim ...................... | G06F 1/1694 345/158 |
| 2012/0288135 A1* | 11/2012 | Jones ...................... | G06K 7/12 382/100 |
| 2012/0307113 A1 | 12/2012 | Peles et al. | |
| 2013/0070928 A1 | 3/2013 | Ellis et al. | |
| 2013/0321268 A1* | 12/2013 | Tuck ...................... | G06F 3/041 345/157 |
| 2014/0014790 A1 | 1/2014 | White et al. | |
| 2014/0081571 A1* | 3/2014 | Briggs .................. | G01C 15/06 701/491 |
| 2014/0135117 A1* | 5/2014 | Abe ...................... | A63F 13/06 463/31 |
| 2014/0201126 A1 | 7/2014 | Zadeh et al. | |
| 2014/0240077 A1 | 8/2014 | Otsuka et al. | |
| 2014/0240350 A1 | 8/2014 | Chen et al. | |
| 2014/0267400 A1* | 9/2014 | Mabbutt ................ | G06F 1/163 345/633 |
| 2014/0285404 A1 | 9/2014 | Takano et al. | |
| 2014/0313142 A1 | 10/2014 | Yairi | |
| 2014/0375683 A1 | 12/2014 | Salter et al. | |
| 2015/0029294 A1 | 1/2015 | Lin et al. | |
| 2015/0276949 A1* | 10/2015 | Grobshtein .......... | G01T 1/1647 250/362 |
| 2015/0341536 A1* | 11/2015 | Huang .................. | H04N 5/2328 348/208.2 |
| 2015/0370393 A1 | 12/2015 | Hsu | |
| 2015/0378161 A1* | 12/2015 | Bailey ................... | G02B 27/30 345/8 |
| 2015/0378164 A1* | 12/2015 | Bailey ................... | G02B 27/30 359/633 |
| 2016/0090283 A1* | 3/2016 | Svensson .................. | B66F 9/14 701/50 |
| 2016/0094790 A1 | 3/2016 | Yu | |
| 2016/0259515 A1* | 9/2016 | Sabina ................. | A61C 9/0053 |
| 2016/0274365 A1* | 9/2016 | Bailey ................ | G02B 27/0093 |
| 2016/0350977 A1* | 12/2016 | Doronichev .......... | G06F 3/0482 |
| 2017/0092002 A1 | 3/2017 | Brian et al. | |
| 2017/0094227 A1 | 3/2017 | Williams et al. | |
| 2017/0103535 A1 | 4/2017 | Mathsyendranath et al. | |
| 2017/0131793 A1 | 5/2017 | Wang | |
| 2017/0199653 A1 | 7/2017 | Rajasankar | |
| 2017/0200296 A1* | 7/2017 | Jones ...................... | G06T 11/60 |
| 2017/0237976 A1* | 8/2017 | Matias ................. | H04N 13/398 348/39 |
| 2017/0256051 A1 | 9/2017 | Dwivedi et al. | |
| 2018/0278908 A1* | 9/2018 | Ross ...................... | G06T 19/20 |
| 2019/0304190 A1* | 10/2019 | Johnson ................ | G06T 19/006 |
| 2019/0342535 A1* | 11/2019 | Ross ...................... | G02B 27/017 |

OTHER PUBLICATIONS

Jain et al., "Head-Mounted Display Visualizations to Support Sound Awareness for the Deaf and Hard of Hearing", Proceedings of the 33rd Annual ACM Conference on Human Factors in Computing Systems, Apr. 18-23, 2015, pp. 241-250.
Walker et al., "Making The X Window System Accessible to People With Disabilities", Trace.Wisc.edu, 1993, pp. 1-14.
"Awaring", Artificial IntelligenceLaboratory, Retrieved on Sep. 14, 2016, Webpage available at : http://www.ai.iit.tsukuba.ac.jp/research/038.html.
Extended European Search Report for Application No. EP 17819451.0 dated Jun. 14, 2019, 9 pages.
Office Action for Indonesia Application No. PID201810461 dated Apr. 21, 2020, 4 pages.

* cited by examiner

METHOD AND APPARATUS FOR PROVIDING A VISUAL INDICATION OF A POINT OF INTEREST OUTSIDE OF A USER'S VIEW

TECHNOLOGICAL FIELD

An example embodiment relates generally to the display of an image in which a point of interest may be outside of a user's view and, more particularly, to the provision of a visual indication of the point of interest that is outside of the user's view.

BACKGROUND

Images, including video, may be presented with a panoramic field of view, such as a 360° field of view or a spherical field of view. A panoramic image may exceed the limited field of view of a human. In this regard, the human field of view is limited to approximately 180° (binocular vision 114°) in a horizontal direction and 135° in a vertical direction such that a panoramic image that extends beyond the human field of view, such as a 360° panoramic image or a spherical image, prevents the user from viewing the entire panoramic image at one time, thereby creating the risk that the user will miss points of interest that are presented in the panoramic image but that may lie outside of the user's field of view. For example, a user immersed in a virtual reality application utilizing a 360° panoramic view or a spherical view may be unable to see points of interest outside of their field of view without turning their head or otherwise looking in a different direction.

Traditionally, the spatial audio track associated with an image, such as a video, provides an audible indication as to points of interest that are outside of the field of view of the user, such as points of interest that are further to the right or to the left than the user can currently see without changing the direction in which the user is looking. However, audio signals may not always be utilized in order to indicate the relative location of a point of interest with respect to the current field of view of a user. For example, the image, such as a video, may not have a corresponding audio track to provide the audio cue for the point of interest. Even if the image, such as a video, has an audio track, the user may not wish to play the audio track, such as to avoid complete immersion in a virtual reality experience. Still further, the user may have a hearing impairment which limits or eliminates the effectiveness of audible cue in relation to the points of interest that are outside of the user's field of view.

In these instances in which audio signals are not utilized or are otherwise ineffective for providing an audible cue of a point of interest outside of the field of view of the user, a visual or haptic cue may be introduced to provide an indication of the point of interest outside of the field of view. In regards to a visual cue, an arrow may be presented upon the display indicative of the relative direction of the point of interest with respect to the user's field of view. As to a haptic cue, a virtual reality system, such as a head mounted display, may introduce vibrations on one side or the other of the head of the user to indicate the direction in which the user should look in order to view the point of interest. While such visual or haptic cues may provide an indication of a point of interest outside the field of view of the user, these visual or haptic cues may seem unnatural to the user relative to the image that is being displayed and, as such, may detract from the user experience. Alternatively, the display, such as a virtual reality system incorporating display, may force the user to view the point of interest by changing the image presented upon the display without reliance upon user input or direction. By forcing the user to view the point of interest, the display, such as a virtual reality system incorporating display, eliminates the user's control over the content that the user chooses to view and, as a result, may cause the user to experience virtual reality sickness. Thus, while the provision of an indication of a point of interest that is outside the field of view of the user is useful, the foregoing approaches still suffer from various deficiencies.

BRIEF SUMMARY

A method, apparatus and computer program product configured to provide a visual indication to a user of a point of interest outside of the user's view are provided. The method, apparatus and computer program product of an example embodiment provide a visual indication in a manner that is relatively natural and intuitive to the user so as to enhance, as opposed to detract from, the user experience. Moreover, the intuitive nature of the visual indication provided by the method, apparatus and computer program product of an example embodiment increases the likelihood that a user will change their view in such a manner as to see the point of interest, thereby further enhancing the user experience.

In an example embodiment, a method is provided that includes identifying a point of interest outside of a user's view during display of an image in a first orientation. The method also includes causing at least a portion of the image to be repositioned to provide a visual indication to the user of a point of interest outside of the user's view. After repositioning at least the portion of the image, the method further includes causing at least the portion of the image to return to the first orientation.

The method of an example embodiment causes at least a portion of the image to be repositioned by causing at least a portion of the image to be tilted relative to the first orientation, such as toward the point of interest. In an example embodiment in which the image is displayed upon a planar screen, the method causes at least a portion of the image to be tilted by cropping portions of the image that extend beyond the planar screen and blanking portions of the planar screen that are outside of the image that have been tilted. The method of an example embodiment causes at least a portion of the image to be repositioned by causing at least the portion of the image to be repositioned in advance of the display of the point of interest, such as by a lead time that is based upon a response time of a user to prior repositioning of an image. The method of an example embodiment causes at least a portion of the image to return to the first orientation following a predefined period of time. Additionally or alternatively, the method of an example embodiment causes at least a portion of the image to return to the first orientation in response to user input.

In another example embodiment, an apparatus is provided that includes at least one processor and at least one memory storing computer program code with the at least one memory and computer program code configured to, with the processor, cause the apparatus to at least identify point of interest outside of a user's view during display of an image in a first orientation. The at least one memory and the computer program code are also configured to, with the processor, cause the apparatus to cause at least a portion of the image to be repositioned to provide a visual indication to the user of the point of interest outside of the user's view and, after the repositioning of at least a portion of the image, cause at least the portion of the image to return to the first orientation.

The at least one memory and the computer program code are configured to, with the processor, cause the apparatus of an example embodiment to cause at least a portion of the image to be repositioned by causing at least a portion of the image to be tilted relative to the first orientation, such as by being tilted toward the point of interest. In an embodiment in which the image is displayed upon a planar screen, the at least one memory and the computer program code are configured to, with the processor, cause the apparatus of an example embodiment to cause at least the portion of the image to be tilted by cropping portions of the image that extend beyond the planar screen and blanking portions of the planar screen or outside of the image that has been tilted. The at least one memory and the computer program code are configured to, with the processor, cause the apparatus of an example embodiment, to cause at least a portion of the image to be repositioned by causing at least a portion of the image to be repositioned in advance of the display of the point of interest, such as by a lead time that is based upon a response time of a user to prior repositioning of an image. The at least one memory and the computer program code are configured to, with the processor, cause the apparatus of an example embodiment, to cause at least the portion of the image to return to the first orientation following a predefined period of time. Additionally or alternatively, the at least one memory and the computer program code are configured to, with the processor, cause the apparatus to cause at least a portion of the image to return to the first orientation in response to user input.

In a further example embodiment, a computer program product is provided that includes at least one non-transitory computer-readable storage medium having computer-executable program code instructions stored therein with the computer-executable program code instructions including program code instructions configured to identify a point of interest outside of a user's view during display of an image in a first orientation. The computer-executable program code instructions also include program code instructions configured to cause at least a portion of the image to be repositioned to provide a visual indication to the user of the point of interest outside of the user's view and, after repositioning at least the portion of the image, cause at least the portion of the image to return to the first orientation.

The program code instructions configured to cause at least a portion of the image to be repositioned include, in an example embodiment, program code instructions configured to cause at least a portion of the image to be tilted relative to the first orientation, such as by being tilted toward the point of interest. In an embodiment in which the image is displayed upon a planar screen, the program code instructions configured to cause at least the portion of the image to be tilted include, in an example embodiment, program code instructions configured to crop portions of the image that extend beyond the planar screen and to blank portions of the planar screen that are outside of the image that has been tilted.

In yet another example embodiment, an apparatus is provided that includes means for identifying a point of interest outside of a user's view during display of an image in a first orientation. The apparatus of this example embodiment also includes means for causing at least a portion of the image to be repositioned to provide a visual indication to the user of the point of interest outside of the user's view. The apparatus of this example embodiment further includes means for causing, after repositioning at least a portion of the image, at least a portion of the image to return to the first orientation.

BRIEF DESCRIPTION OF THE DRAWINGS

Figure 1:
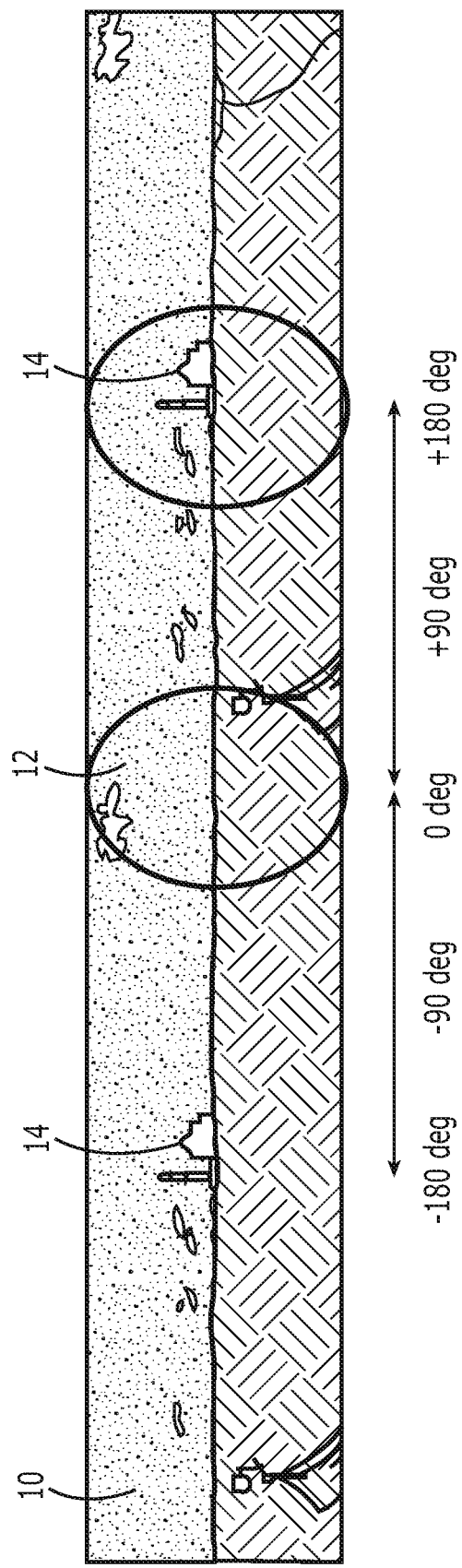
Figure 2:
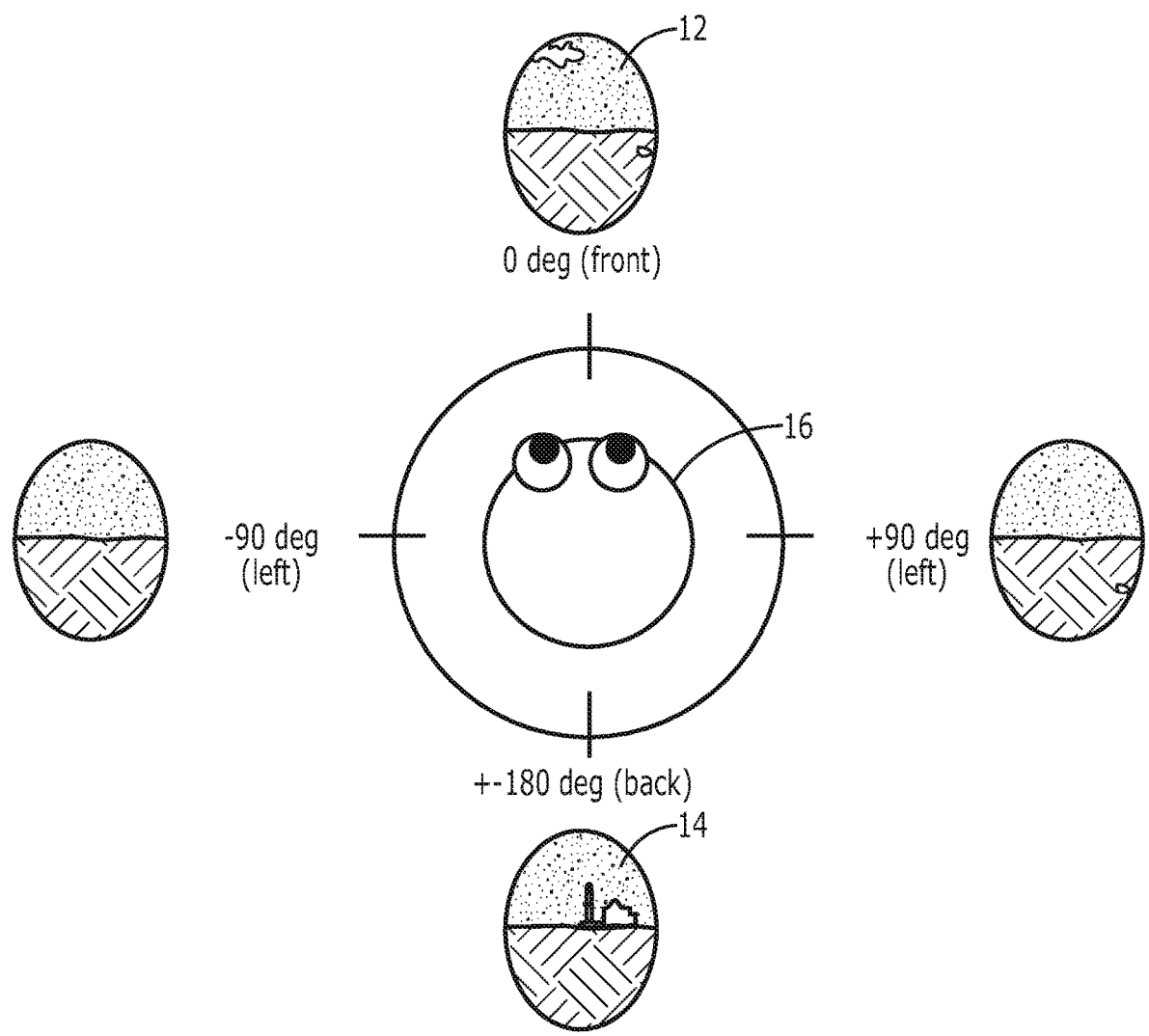
Figure 3:
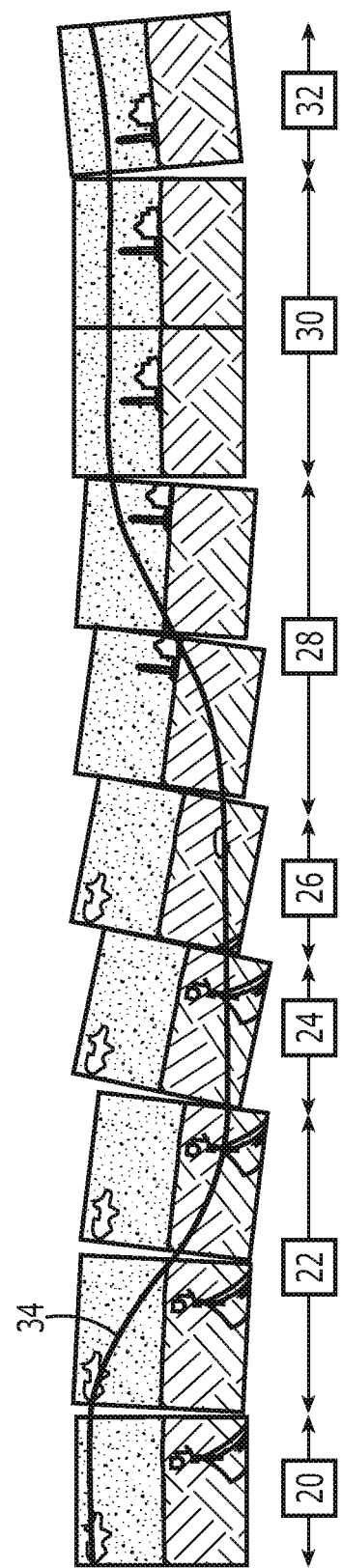
Figure 4:
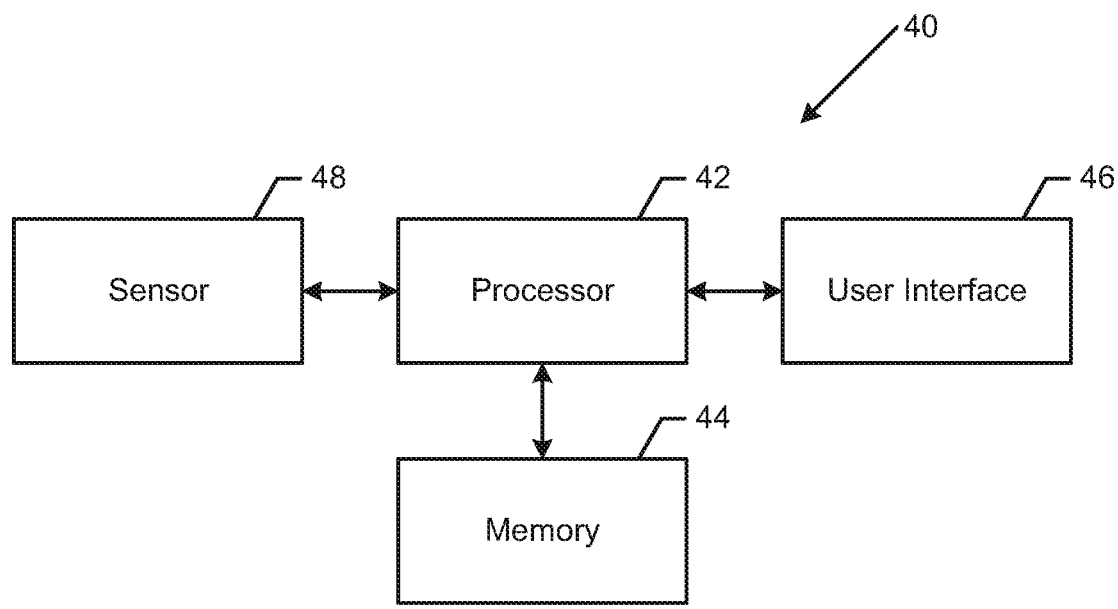
Figure 5:
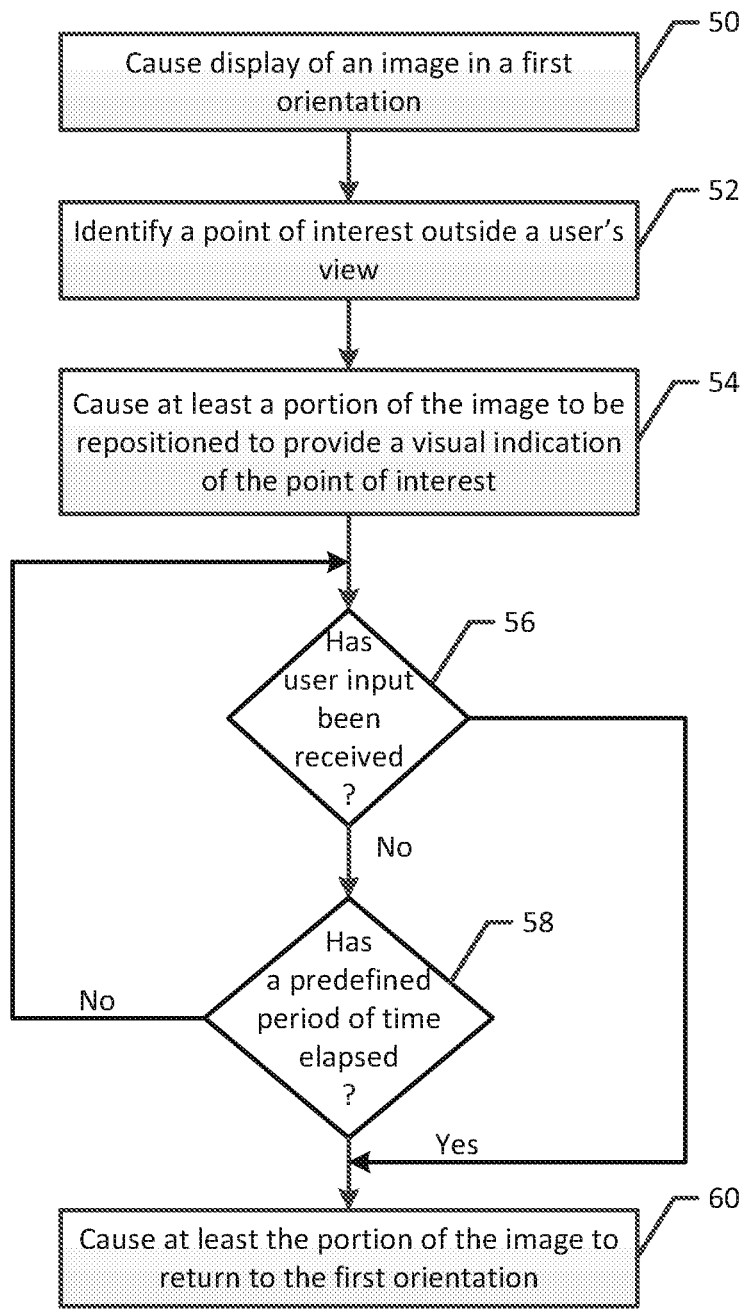
Figure 6A:
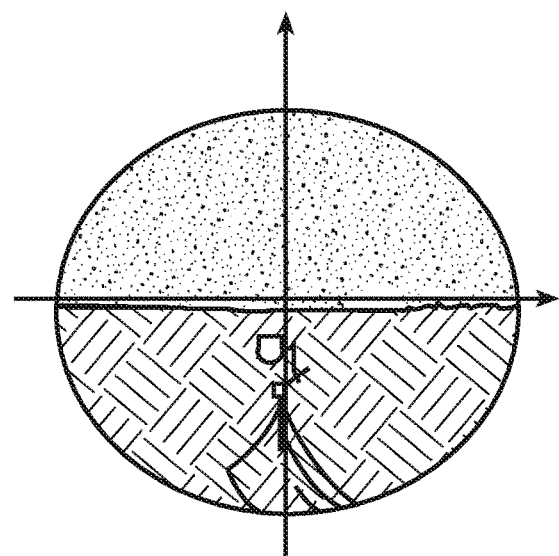
Figure 6B:
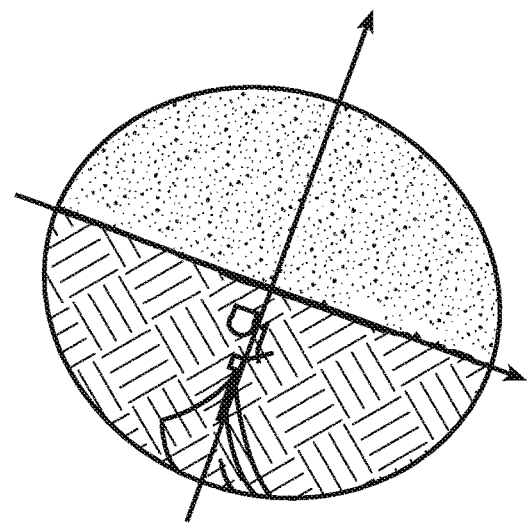
Figure 7A:
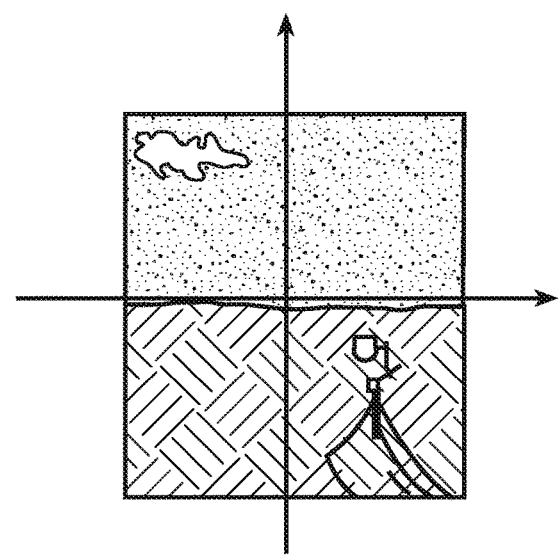
Figure 7B:
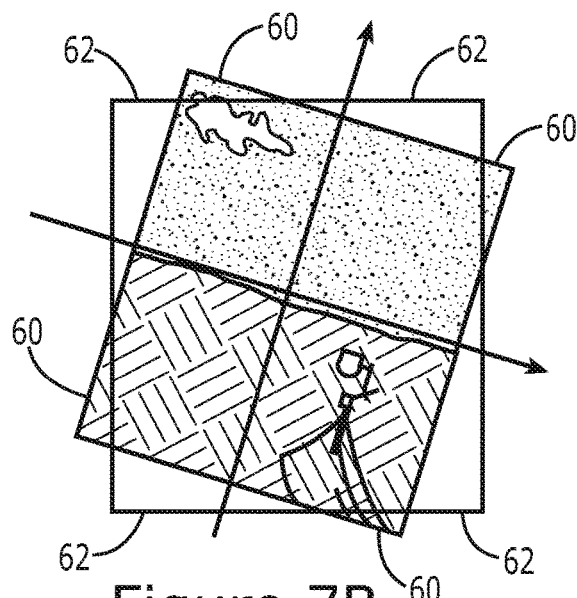
Figure 8:
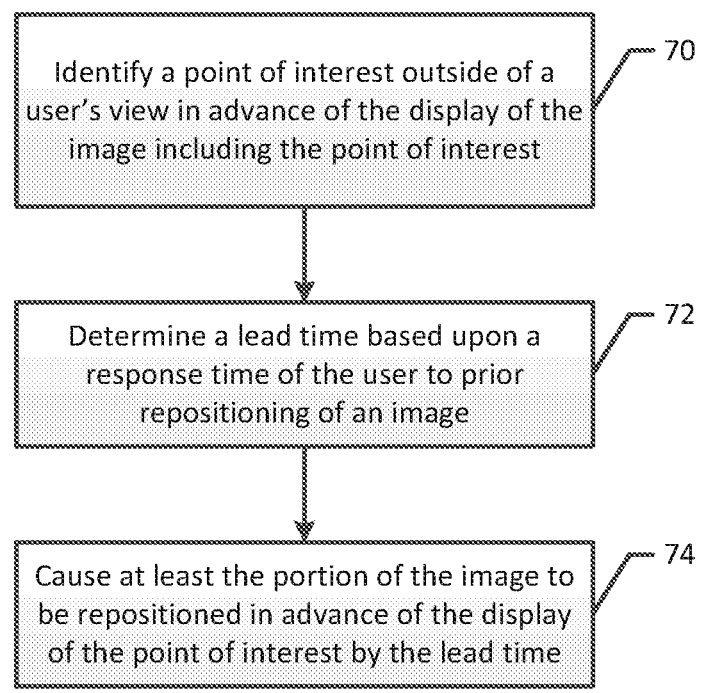

Having thus described certain example embodiments of the present disclosure in general terms, reference will hereinafter be made to the accompanying drawings, which are not necessarily drawn to scale, and wherein:

FIG. 1 is an example of a panoramic image that illustrates a user's view centered about the 0° designation and a point of interest at ±180° relative to the user's view;

FIG. 2 illustrates portions of the panoramic image of FIG. 1 in polar coordinates with the current view of the user centered about 0° and the point of interest at ±180°;

FIG. 3 is a sequence of images displayed over the course of time for a user that serves to provide a visual indication of a point of interest to the right of the user's original view in accordance with an example embodiment of the present invention;

FIG. 4 is a block diagram of an apparatus that may be specifically configured in accordance with an example embodiment of the present invention;

FIG. 5 is a flow chart illustrating operations performed, such as by the apparatus in FIG. 4, in accordance with an example embodiment of the present invention;

FIGS. 6a and 6b are representative of a user's view of a spherical image in which the image of FIG. 6a is presented are in first orientation and the image of FIG. 6b is presented after having been tilted toward the point of interest in accordance with an example embodiment of the present invention;

FIGS. 7a and 7b are representative of an image presented upon a planar display in a first orientation and after having been tilted toward a point of interest, respectively, in accordance with an example embodiment of the present invention; and FIG. 8 is a flow chart illustrating operations performed, such as by the apparatus of FIG. 4, in order to determine the lead time for the visual indication to be presented relative to the display of the point of interest in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to provide a visual indication of a point of interest outside of a user's view during the display of an image. As such, the user may be notified as to the presence of the point of interest and, if desired, the user may redirect their attention towards the point of interest so as to view the point of interest, thereby enhancing the user experience in a manner controlled by the user. By providing a visual indication of a point of interest outside of the user's view, the user is able to be notified of the point of interest without reliance upon audio signals. Thus, the user may be notified by the visual indication provided in accordance with an example embodiment of the present invention of a point of interest outside the user's view in instances in which the image, such as a video, does not have a corresponding audio track or in instances in which the user cannot or does not wish to listen to the spatial audio track, such as in instances in which the user is hearing impaired. Moreover, the method, apparatus and computer program product of an example embodiment are configured to provide the visual indication of a point of interest outside of the user's view in a manner that is intuitive to the user and that appears relatively natural relative to the image that is displayed, thereby increasing the likelihood that the user will change their view in order to view the point of interest and further enhance the resulting user experience.

Referring now to FIG. 1, an example of an image 10 that may be displayed is presented. The image of FIG. 1 provides a panoramic view and may either be a single image or a video comprised of a plurality of frames. Regardless, the image is larger than the view of the user in at least one direction, such as in the horizontal, e.g., right/left direction, in FIG. 1. By being larger than the view of the user, the image may include points of interest outside of the view of the user for which a visual indication may be provided in accordance with an example embodiment. In the embodiment of FIG. 1, a panoramic view, such as a 360° view, is illustrated, while in other embodiments, the image may be a spherical image.

As shown in FIG. 1, the user's view 12 is centered about 0° and includes a portion, but not all, of the image 10. As such, the image includes other portions outside the current view of the user. In this regard, a point of interest 14, such as a rocket that is being launched, is captured by the image, but is outside of the current view of the user and is, instead, located, in this example, at both ±180° relative to the user's current view. Another example of the same image as that presented in FIG. 1 is shown in FIG. 2, albeit in polar coordinates. As shown in FIG. 2, the user's current view is centered about 0°. Other portions of the image, including those to the right of the user at +90° and to the left of the user at −90° are outside of the user's current view. Additionally, a point of interest associated with a rocket that is being launched at ±180°, that is, immediately behind the user relative to their current view, is also outside of the current view of the user.

In order to notify the user as to a point of interest captured by the image, but outside the current view of the user, at least a portion of the image may be repositioned in order to provide a visual indication of the point of interest. Although the image may be repositioned in various manners, the method, apparatus and computer program product of an example embodiment are configured to reposition at least a portion of the image by causing at least a portion of the image to be tilted, such as in a direct toward the point of interest, thereby intuitively causing the user to consider redirecting their view, such as by turning their head or otherwise altering their gaze, in an effort to view the point of interest.

By way of example and with respect to FIG. 3, a portion of the image is initially presented in a first orientation as shown at 20 with the horizon extending in a horizontal direction. In response to the identification of a point of interest within the image to the right of the user's view, at least the portion of the image within the user's view is repositioned, such as by being tilted to the right as shown at 22 with the image eventually reaching a maximum tilt angle as shown at 24. As the user turns their head to the right or otherwise diverts their gaze to the right, the image is again repositioned as shown at 26 and 28 to return the image to the first orientation while the view is updated to include the point of interest based upon the change in the direction of the user's gaze as shown at 30. If the user diverts their gaze too far to the right beyond the point of interest, at least a portion of the image may again be repositioned, such as by being tilted in the opposite direction as shown at 32, in an effort to cause the user to redirect their gaze to the point of interest. Although the extent of the repositioning is depicted by the sequence of images, line 34 also illustrates the gradient of the tilting of the image with the gradient changing as the image is repositioned and then subsequently returned to the first orientation.

The apparatus 40 configured to provide the visual indication of a point of interest outside of the user's view may be embodied in various devices including, for example, a virtual reality system, such as a head mounted display. Alternatively, the apparatus may be embodied by another computing device, such as a personal computer, a computer workstation, a server or the like, or by any of various mobile computing devices, such as a mobile terminal, e.g., a smartphone, a tablet computer, a video game player, etc.

Regardless of the manner in which the apparatus 40 is embodied, the apparatus of an example embodiment is configured to include or otherwise be in communication with a processor 42, a memory device 44, a user interface 46 and one or more sensors 48. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 40 may be embodied by a computing device, such as a computing system embodied by or otherwise associated with a virtual reality system. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 42 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 42 may be configured to execute instructions stored in the memory device 44 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 40 may include a user interface 46 that may, in turn, be in communication with the processor 42 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. For example, the user interface may include the display, such as a head mounted display, of a virtual reality system. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 44, and/or the like).

The apparatus 40 may also include or otherwise be in communication with one or more sensors 48. The sensor is configured to determine the direction in which the user is gazing and, as such, may be embodied in various different manners. For example, the sensor may include a gaze tracker configured to monitor the direction in which the user is gazing. Additionally or alternatively, the sensor may include one or more gyroscopes, accelerometers or the like configured to determine the position and movement of the user's head, such as by detecting movement of the user's head to the right, to the left, upwardly, downwardly or some combination thereof.

Referring now to FIG. 5, the operations performed in order to provide a visual indication of a point of interest outside of the user's current view are depicted in accordance with an example embodiment. As shown in block 50 of FIG. 5, the apparatus 40 includes means, such as the processor 42, the user interface 46 or the like, for causing display of an image in a first orientation. As described above, the image may be a still image or a video. In an example embodiment, the image is a panoramic view, such as a 360° view or a spherical view. However, other types of images may be displayed with the image being larger than the view of the user, so as to include points of interest outside of the view of the user.

Depending upon the manner in which the apparatus 40 is embodied, the image may be displayed in various manners. For example, in embodiments in which the apparatus is embodied by a virtual reality system, such as a holodeck, the image may be displayed by a head mounted display of the virtual reality system that is worn by the user. Alternatively, in embodiments in which the apparatus is embodied by a mobile terminal or other hand held device, the image may be displayed by a screen, such as a planar screen, of the mobile terminal or other hand held device.

As shown at block 52 of FIG. 5, the apparatus 40 also includes means, such as the processor 42 or the like, configured to identify a point of interest outside of the user's view. The point of interest may be identified in various manners. For example, the point of interest and its location may be identified by data, such as metadata, associated with the image and accessible by the processor. Alternatively, the apparatus, such as the processor, may be configured to analyze the image and to identify points of interests, such as based upon a comparison to a library of predefined points of interests and/or based upon the identification of objects that are in motion or that otherwise satisfy a criteria associated with a point of interest.

Following the identification of a point of interest outside of the user's view, the apparatus 40 includes means, such as the processor 42, the user interface 46 or the like, for causing at least a portion of the image to be repositioned to provide a visual indication to the user of the point of interest outside of the user's current view. See block 54. While the entire image may be repositioned to provide the visual indication of the point of interest, the apparatus, such as the processor, of one environment only repositions the portion of the image that is within the user's view in one embodiment, while the apparatus, such as the processor, of another embodiment only repositions a window defined within the user's current view. The images are repositioned in a manner that provides a visual indication to the user at a point of interest outside of the user's current view. As such, the images may be repositioned in various manners. In an example embodiment, however, at least a portion of the image is tilted relative to the first orientation, such as by rotating the image clockwise or counterclockwise relative to the first orientation. In the example of FIGS. 1 and 2, the first orientation is an orientation in which the horizon is horizontal. Thus, a portion of the image is tilted, such as to the right or to the left, relative to the first orientation, that is, relative to the orientation in which the horizon is horizontal, in order to provide the visual indication to the user that a point of interest exists in the image outside the user's current view. In order to provide a visual indication that is intuitive, the portion of the image may be tilted to the right, that is, in a clockwise direction, to indicate that a point of interest is located outside of, but to the right of the current view, while the portion of the image may be tilted to the left, that is, in a counterclockwise direction, to indicate that a point of interest is located outside of, but to the left of the current view.

As described above with respect to FIG. 3, the identification of a point of interest to the right of the user's view causes the image to be titled to the right at 22 up to a maximum tilt angle 24. The maximum tilt angle may be configurable and may, for example, be defined by the user or by the system. By way of another example and with reference to FIGS. 6a and 6b, the user's view of an image displayed in the first orientation is depicted in FIG. 6a, while the user's view of the image following repositioning, e.g., tilting, of the portion of the image corresponding to the user's view is shown in FIG. 6b to provide a visual indication of a point of interest to the right of the user's view.

As indicated above, the image is displayed in some embodiments upon a planar screen, such as in conjunction with embodiments in which the apparatus 40 is embodied by a mobile terminal or other hand held device. As shown in FIG. 7, the user's current view of the image in the first orientation is displayed upon and fills the planar screen. In this example embodiment, the tilting of the portion of the image corresponding to the user's current view in order to provide the visual indication of the point of interest outside of the current view is depicted in FIG. 7b. As shown, the apparatus of this example embodiment includes means, such as the processor 42, the user interface 46 or the like, for cropping portions of the image, such as the corner portions of the image, that extend beyond the planar screen, and means, such as the processor, the user interface or the like, for blanking portions of the planar screen, such as corner portion portions of the planar screen shown in black in FIG. 7b, that are outside of the image that has been tilted. As such, the resulting image will clearly appear to the user to have been tilted to the right in FIG. 7b as a result of the tilted outline of the image.

As shown in FIG. 3, the image may be sequentially or gradually repositioned, e.g., tilted, until the image has been repositioned to a predefined maximum extent, such as by having been tilted to a maximum tilt angle at which position the repositioned image remains, for example, until user input is received and/or a predefined period of time has elapsed as described below. The rate at which the image is repositioned, e.g., tilted, and the maximum extent of permissible repositioning, e.g., the maximum tilt angle, may have various predefined value. In one embodiment, however, the maximum tilt angle is 15° and the image is repositioned at a constant rate sufficient to tilt the image from 0° to 15° in 1 second.

As shown in block 60 of FIG. 5, after having repositioned at least a portion of the image, the apparatus 40 includes means, such the processor 42, the user interface 46 or the like, configured to cause at least a portion of the image to return to the first orientation. As shown in FIG. 3, for example, after the user has redirected their view toward the point of interest, the image is returned to the first orientation as shown at 26, 28 and 30 in which the horizon is horizontal, such as by rotating the image in a counter-clockwise direction. The rate at which the image is returned to the first orientation may be equal to the rate at which the image was previously repositioned, or another rate, quicker or slower, than the rate at which the image was previously repositioned, such as a rate that is dependent upon, such as by being directly proportional to, the rate at which the user is altering their gaze, e.g., the rate at which the user is turning their head or reorienting the hand-held display in an embodiment in which the apparatus is embodied by a mobile terminal or other hand-held device.

The apparatus 40, such as a processor 42, may cause at least a portion of the image to return to the first orientation for various reasons, such as following the expiration of a predefined period of time and/or in response to user input. As shown in decision block 56 of FIG. 5, the apparatus of an example embodiment includes means, such as the processor, the user interface 46, the sensor(s) 48 or the like, for determining whether user input has been received that is indicative of a desire to return at least the portion of the image to the first orientation. Various types of user input may be detected by the sensor(s) and utilized in order to cause the image to return to the first orientation including, for example, a tilting of the user's head in a direction opposite the direction in which the image has been tilted and/or the shaking of the user's head back and forth to the left and right, such as in an instance in which the user shakes their head to indicate a negative response. In an instance in which the user input indicative of a desired return of the image to the first orientation is received, the apparatus, such as the processor or the like, is caused to cause the image to return to the first orientation as shown at block 60.

If the user input has not been received, however, the apparatus 40 of an example embodiment includes means, such as the processor 42 or the like, for determining whether a predefined period of time has elapsed since the repositioning of the image. See block 58. As noted above, the predefined period of time may be set to various time periods, such as 3 seconds in one embodiment. In an instance in which the predefined period of time has elapsed, the apparatus, such as the processor, is caused to cause the image to return to the first orientation as shown at block 60. However, in an instance in which the predefined period of time has not yet elapsed since the repositioning of the image, the apparatus, such as the processor or the like, continues to monitor for user input or the elapse of the predefined period of time, while maintaining the image in the repositioned orientation.

The apparatus 40, such as the processor 42, need not always reposition the image to the maximum permissible extent, such as to the maximum tilt angle. For example, in an embodiment in which at least a portion of the image is repositioned by being tilted and the user responds by correspondingly turning their head so as to adjust the view toward the point of interest, the apparatus, such as the processor, may be configured to begin to cause the image to return to the first orientation, such as an orientation in which the horizon is horizontal, in response to a predefined user input, such as provided by the user returning their head to the initial position, such as an upright, untilted position, in advance of the display of the point of interest and prior to the repositioning of the image to the maximum permissible extent. Thus, the image may be more quickly returned to its intended orientation in this example embodiment.

As described, the apparatus 40, such as the processor 42, the user interface 46 or the like, is configured in an example embodiment to tilt at least a portion of the image toward the point of interest. For 360° images and spherical images, the user may be encouraged by the tilting of the image to look in either one of opposite directions in order to locate the point of interest with the apparatus, such as the processor, being configured to determine the manner in which to tilt the image in various manners. In an example embodiment, the apparatus, such as the processor, is configured to determine the shortest distance, such as the smallest angular distance, from the current center view of the user to the point of interest and to then cause the image to be tilted in a direction toward the point of interest that extends through the shortest distance to the point of interest. For example, if the point of interest is located 90° to the right of the user's current view and 270° to the left of the user's current view, the apparatus, such as the processor, is configured to cause the image to be tilted to the right, such as in a clockwise direction, in order to encourage the user to look to the right and, as a result, view the point of interest more quickly than if the user had looked to the left.

Additionally, or alternatively, the direction in which the image is tilted in order to provide a visual indication of a point of interest outside of the user's current view may be defined by the director and/or cinematographer of the image, such as a video. The director and/or cinematographer may define the direction in which the image is to be tilted after having taken various considerations into account, such as causing the image to be tilted so as to induce the user to redirect their view in an associated direction, e.g., to the right or to the left. In this regard, the director and/or cinematographer may take into account the location of minor points of interest between the user's current view and the point of interest for which the visual indication is provided and/or the visual perception created and/or the artistic scenery existing between the user's current view and the point of interest for which the visual indication is provided. Still further, the direction in which the image is tilted may be based upon properties of the view that includes the point of interest including contrast, colors, etc. with the direction in which the image is tilted being selected so as to better match the properties of the view, including the point of interest. Alternatively, the apparatus, such as the processor, of an alternate embodiment may alternate between tilting the image in one direction, such as by clockwise rotation, and then subsequently tilting the image for a second point of interest in the opposite direction, such as by a counter-clockwise rotation. Still further, the apparatus, such as the processor, may be configured to determine the direction in which the object is to be tilted in order to provide a visual indication of the point of interest outside the user's current view based on statistical analysis, such as in an effort to balance tilting of the images between those images tilted to the right and those images tilted to the left according to a predefined relationship, such as 50/50. In still further embodiments, the direction in which the apparatus, such as the processor, is configured to cause the image to be tilted in order to provide a visual indication of a point of interest outside the user's current view may be performed randomly. In yet other embodiments, the apparatus, such as the processor, may be configured, such as by the user, to always cause the image, such as a 360° or spherical image, to tilt in the same direction, such as in an instance in which the user has a neck or other physical impairment that only permits the user to turn their head in one direction, but not the opposite direction. In this example embodiment, the apparatus, such as the processor, may be configured to always cause the image to tilt in a direction that encourages the user to turn their head in the direction that they are able.

For 360° or spherical images in which the image is tilted in a first direction in order to encourage the user to turn their head in the first direction, a user may sometimes turn their head in the opposite direction. In this situation, the apparatus 40, such as the processor 42, of an example embodiment may be configured to reorient the image so as to tilt the image in the opposite direction, thereby encouraging the user to continue to tilt their head in the opposite direction, since doing so will still allow the user to change their view to see the point of interest. Alternatively, the apparatus, such as the processor, may maintain the tilt of the image in the first direction and may reposition the image to eliminate the tilt once the user has changed their view, albeit in the opposite direction, so as to now have the point of interest in their view.

As noted above, the repositioning of the image may be eliminated or may begin to be eliminated following the elapse of the predefined period of time following the repositioning of the image to the maximum extent, such as to the maximum tilt angle. This predefined period of time may be modified, however, such as by predefined amounts or steps in response to user input while the image has been repositioned. Various types of user input may be predefined in order to controllably increase or decrease the predefined period of time for which the image will remain repositioned. For example, the tilting of the user's head in an upward direction by raising their chin may increase the time during which the image will remain repositioned, while the tilting of the user's head in a downward direction by lowering their chin toward their chest may decrease the predefined period of time during which the image will remain repositioned.

The repositioning of at least a portion of the image may be repeated in order to provide a visual indication of either the same or different points of interest to the user. In the example of FIG. 3, the user redirects their view so as to see the point of interest. As the point of interest is centered within the user's redirected view as shown at 30, the image is returned to the first orientation in which the horizon is horizontal. However, as shown by the last of the time sequence of images at 32, the user has redirected their gaze too far, so as to look past the point of interest such that the point of interest is no longer centered within the current view. As such, the image is then repositioned, such as by being tilted in the opposite direction, that is, in a counter-clockwise direction, in an effort to cause the user to look to their left and re-center the object of interest within the current view.

In conjunction with a video or other temporally sequential sequence of images, the apparatus 40 includes means, such as the processor 42, configured to cause at least a portion of the image to be repositioned in advance of the display of the point of interest. Thus, in relation to the image of FIGS. 1-3, the image may be repositioned in advance of the launch of the rocket such that the user has an opportunity to redirect their view to the point of interest prior to or concurrent with the occurrence of the point of interest. In an example embodiment depicted in FIG. 8, the apparatus, such as the processor, is configured to identify a point of interest outside of the user's view in advance of the display of the image including the point of interest. See block 70. In this example embodiment, the apparatus includes means, such as the processor, configured to determine a lead time based upon a response time of the user to prior repositioning of an image. See block 72. In other words, the apparatus, such as the processor, determines the response time of the user during previous instances in which an image was repositioned and the user responded thereto by redirecting their view. Thus, in instances in which the user has responded quickly in the past such that the response time of the user is relatively small, the lead time is corresponding time is relatively small such that the image is repositioned only a short time in advance of the presentation of the point of interest. However, in other instances in which user has responded slowly in the past such that the response time of the user is relatively large, the lead time is correspondingly large such that the image is repositioned a much greater time in advance of the occurrence of the point of interest so as to provide the user with an opportunity to redirect their use so as to view the point of interest prior to its presentation. As shown in block 74 of FIG. 8, the apparatus, of this example embodiment also includes means, such as the processor, configured to cause at least the portion of the image to be repositioned in advance of the display of the point of interest by the lead time that has been determined based upon the response time of the user to prior repositioning of an image.

A method, apparatus 40 and computer program product are therefore provided in accordance with example embodiments in order to provide a visual indication to a user of a point of interest outside of the user's view. The method, apparatus and computer program product of an example embodiment provide a visual indication in a manner that is relatively natural in that nothing is added or removed from the view and the repositioning of the image is relatively subtle. Further, the method, apparatus and computer program product of an example embodiment provide a visual indication in a manner that permits the user to remain in control of their view and is intuitive to the user in that movement of the user's head in the direction toward the point of interest is a natural response to the repositioning, e.g., tilting, of the image. Moreover, the intuitive nature of the visual indication provided by the method, apparatus and computer program product of an example embodiment may increase the likelihood that a user will change their view in such a manner as to see the point of interest, thereby enhancing the user experience.

As described above, FIGS. 5 and 8 illustrate flowcharts of an apparatus 40, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 44 of an apparatus employing an embodiment of the present invention and executed by the processor 42 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. A method comprising:
during display of an image in a first orientation, identifying a point of interest outside of a user's view of a portion of the image;
providing a visual indication to the user of the point of interest outside of the user's view by causing at least a portion of the image within the user's view to be repositioned so as to have an orientation, different than the first orientation, that provides the visual indication of the point of interest outside of the user's view; and
after repositioning at least the portion of the image, causing at least the portion of the image to return to the first orientation.

2. A method according to claim 1 wherein causing at least a portion of the image to be repositioned comprises causing at least the portion of the image to be tilted relative to the first orientation.

3. A method according to claim 2 wherein at least the portion of the image is gradually tilted toward the point of interest.

4. A method according to claim 2 wherein the image is displayed upon a planar screen, and wherein causing at least the portion of the image to be tilted comprises cropping portions of the image that extend beyond the planar screen and blanking portions of the planar screen that are outside of the image that has been tilted.

5. A method according to claim 1 wherein causing at least a portion of the image to be repositioned comprises causing at least the portion of the image to be repositioned in advance of the display of the point of interest.

6. A method according to claim 5 wherein causing at least the portion of the image to be repositioned in advance of the display of the point of interest comprises causing at least the portion of the image to be repositioned in advance of the display of the point of interest by a lead time that is based upon a response time of a user to prior repositioning of an image.

7. A method according to claim 1 wherein causing at least the portion of the image to return to the first orientation comprises causing at least the portion of the image to return to the first orientation following a predefined period of time.

8. A method according to claim 1 wherein causing at least the portion of the image to return to the first orientation comprises causing at least the portion of the image to return to the first orientation in response to user input captured by at least one sensor.

9. An apparatus comprising at least one processor and at least one memory storing computer program code, the at least one memory and the computer program code configured to, with the processor, cause the apparatus to at least:
during display of an image in a first orientation, identify a point of interest outside of a user's view of a portion of the image;
provide a visual indication to the user of the point of interest outside of the user's view by causing at least a portion of the image within the user's view to be repositioned so as to have an orientation, different than the first orientation, that provides the visual indication of the point of interest outside of the user's view; and
after repositioning at least the portion of the image, cause at least the portion of the image to return to the first orientation.

10. An apparatus according to claim 9 wherein the at least one memory and the computer program code are configured to, with the processor, cause the apparatus to cause at least a portion of the image to be repositioned by causing at least the portion of the image to be tilted relative to the first orientation.

11. An apparatus according to claim 10 wherein at least the portion of the image is gradually tilted toward the point of interest.

12. An apparatus according to claim 10 wherein the image is displayed upon a planar screen, and wherein the at least one memory and the computer program code are configured to, with the processor, cause the apparatus to cause at least the portion of the image to be tilted by cropping portions of the image that extend beyond the planar screen and blanking portions of the planar screen that are outside of the image that has been tilted.

13. An apparatus according to claim 9 wherein the at least one memory and the computer program code are configured to, with the processor, cause the apparatus to cause at least a portion of the image to be repositioned by causing at least the portion of the image to be repositioned in advance of the display of the point of interest.

14. An apparatus according to claim 13 wherein the at least one memory and the computer program code are configured to, with the processor, cause the apparatus to cause at least the portion of the image to be repositioned in advance of the display of the point of interest by causing at least the portion of the image to be repositioned in advance of the display of the point of interest by a lead time that is based upon a response time of a user to prior repositioning of an image.

15. An apparatus according to claim 9 wherein the at least one memory and the computer program code are configured to, with the processor, cause the apparatus to cause at least the portion of the image to return to the first orientation by causing at least the portion of the image to return to the first orientation following a predefined period of time.

16. An apparatus according to claim 9 wherein the at least one memory and the computer program code are configured to, with the processor, cause the apparatus to cause at least the portion of the image to return to the first orientation by causing at least the portion of the image to return to the first orientation in response to user input captured by at least one sensor.

17. A computer program product comprising at least one non-transitory computer-readable storage medium having computer-executable program code instructions stored therein, the computer-executable program code instructions comprising program code instructions configured to:
during display of an image in a first orientation, identify a point of interest outside of a user's view of a portion of the image;
provide a visual indication to the user of the point of interest outside of the user's view by causing at least a portion of the image within the user's view to be repositioned so as to have an orientation, different than the first orientation, that provides the visual indication of the point of interest outside of the user's view; and
after repositioning at least the portion of the image, cause at least the portion of the image to return to the first orientation.

18. A computer program product according to claim 17 wherein the program code instructions configured to cause at least a portion of the image to be repositioned comprise program code instructions configured to cause at least the portion of the image to be tilted relative to the first orientation.

19. A computer program product according to claim 18 wherein at least the portion of the image is gradually tilted toward the point of interest.

20. A computer program product according to claim 18 wherein the image is displayed upon a planar screen, and wherein the program code instructions configured to cause at least the portion of the image to be tilted comprise program code instructions configured to crop portions of the image that extend beyond the planar screen and blank portions of the planar screen that are outside of the image that has been tilted.

* * * * *